United States Patent
Baumert et al.

(10) Patent No.: US 7,996,514 B2
(45) Date of Patent: Aug. 9, 2011

(54) SYSTEM AND METHOD FOR SHARING INFORMATION BASED ON PROXIMITY

(75) Inventors: David W. Baumert, Sammamish, WA (US); Aaron F. Woodman, Seattle, WA (US); Flora P. Goldthwaite, Seattle, WA (US); Jonathan Cluts, Sammamish, WA (US); Pamela J. Heath, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 945 days.

(21) Appl. No.: 10/743,312

(22) Filed: Dec. 23, 2003

(65) Prior Publication Data

US 2005/0138576 A1 Jun. 23, 2005

(51) Int. Cl.
*G06F 15/173* (2006.01)
*G06F 15/16* (2006.01)

(52) U.S. Cl. ............... 709/224; 709/203; 709/208
(58) Field of Classification Search ............ 709/203, 709/226, 208, 224
See application file for complete search history.

(56) References Cited

U.S. PATENT DOCUMENTS

| | | | |
|---|---|---|---|
| 6,201,968 B1* | 3/2001 | Ostroff et al. ............ 455/436 |
| 6,675,196 B1* | 1/2004 | Kronz ............... 709/203 |
| 7,102,640 B1* | 9/2006 | Aholainen et al. ............ 345/440 |
| 7,103,834 B1* | 9/2006 | Humpleman et al. ...... 715/501.1 |
| 2003/0014766 A1* | 1/2003 | Dinwiddie et al. ........... 725/126 |
| 2003/0037284 A1* | 2/2003 | Srinivasan et al. .............. 714/11 |
| 2004/0003073 A1* | 1/2004 | Krzyzanowski et al. ..... 709/223 |
| 2004/0107246 A1* | 6/2004 | Akashika et al. ............ 709/203 |
| 2005/0086273 A1* | 4/2005 | Loebbert et al. ............. 707/204 |
| 2006/0074810 A1* | 4/2006 | Verberkt et al. ................ 705/57 |
| 2007/0033265 A1* | 2/2007 | Anderson et al. ............ 709/217 |
| 2007/0105548 A1* | 5/2007 | Mohan et al. ............. 455/426.1 |

\* cited by examiner

*Primary Examiner* — Karen C Tang
(74) *Attorney, Agent, or Firm* — Shook, Hardy & Bacon L.L.P.

(57) ABSTRACT

A method and system are provided for facilitating interaction between a device and a device environment. The system may include a detection module for automatically detecting proximity of a participant within the device environment. The system may additionally include a user-configurable authorization module for authorizing the device to adjust a device user interface in a pre-determined manner in response to the detection of the participant. The system may also provide for sharing resources among multiple participating devices, wherein each of the multiple participating devices has a device specific set of application resources. The system may additionally include a configurable resource regulation mechanism for making the device specific application resources from the second participating device available to the first participating device.

20 Claims, 9 Drawing Sheets

SYSTEM AND METHOD FOR SHARING INFORMATION BASED ON PROXIMITY

FIELD OF THE INVENTION

The present invention relates to the field of sharing information over a network and more particularly to techniques for sharing information based on proximity within a particular environment.

BACKGROUND OF THE INVENTION

With widespread adoption of wireless networks and the proliferation of networked devices and objects, it is desirable to create products that intelligently take advantage of these networking capabilities. One currently available networking option is Bluetooth, which is a short-range radio technology aimed at simplifying communications among Internet devices and between Internet devices and other computers. Bluetooth uses short-range radio links to replace cables between computers and connected units.

Using Bluetooth and other similar technologies, mobile devices can communicate with one another when the devices are within a pre-determined distance from one another. For instance, a Bluetooth computer can detect a Bluetooth printer in its vicinity and wirelessly execute a print job. Similarly, a mobile phone using the Bluetooth network can communicate with a nearby computer to inform a user that the computer has received an email.

Other technologies that facilitate communications between devices include wireless local area networks (WLANs), wireless application protocol (WAP), and Infrared Technologies such as IrDA-Data. All of these technologies are capable of simplifying wireless communications between devices and can be used optimally in different environments. For example, WLANs are LAN protocols modulated on carrier waves. WLANs can handle greater data throughput than Bluetooth and are generally server-based, whereas Bluetooth technologies are generally peer-to-peer. WAP is a communications protocol for mobile phones intended to extend available Internet-based services. IR technologies require that a data beam be aimed at a receiving antenna. Accordingly, IR technologies require a free line of sight.

While these currently available technologies facilitate wireless communications, they do not currently fully utilize the potential for devices to share information with one another and to acquire information from nearby objects. In particular, networking options within particular environments, such as the home environment, can utilize location-based component technologies. Knowledge of physical space and proximity have not been adequately utilized to present information.

Accordingly, a solution is needed that allows networked devices to interact with other networked devices intelligently. Furthermore, a solution is needed that will allow networked devices to interact intelligently with other nearby objects. For instance, a solution is needed that will allow devices to adjust their offerings and capabilities based on the collection of devices or objects in the area.

SUMMARY OF THE INVENTION

In one aspect, the present invention is directed to a system for facilitating interaction between a device and a device environment. The system includes a detection module for automatically detecting proximity of a participant within the device environment and a user-configurable authorization module for authorizing the device to adjust a device user interface in a pre-determined manner in response to the detection of the participant.

In yet another aspect, the present invention is directed to a method for facilitating interaction between a device and a device environment. The method includes detecting a participant present within the device environment and adjusting a device user interface based on user-configured rules set forth in a device authorization module in response to the detection of the participant.

In an additional aspect, the invention is directed to a system for sharing resources among multiple participating devices, wherein each of the multiple participating devices has a device specific set of application resources. The system includes a detection module for detecting proximity of a first participating device to a second participating device and a configurable resource regulation mechanism for making the device specific application resources from the second participating device available to the first participating device.

In a further aspect, the invention is directed to a method for facilitating resource sharing between multiple devices. The method includes allowing a user to configure regulation of shared resources between multiple participating devices and enabling regulation of device resources based on proximity of a first participating device to a second participating device. Regulation includes making device specific application resources of the first participating device available to the second participating device.

BRIEF DESCRIPTION OF THE DRAWINGS

The present invention is described in detail below with reference to the attached drawing figures, wherein.

DETAILED DESCRIPTION OF THE INVENTION

Figure 1:
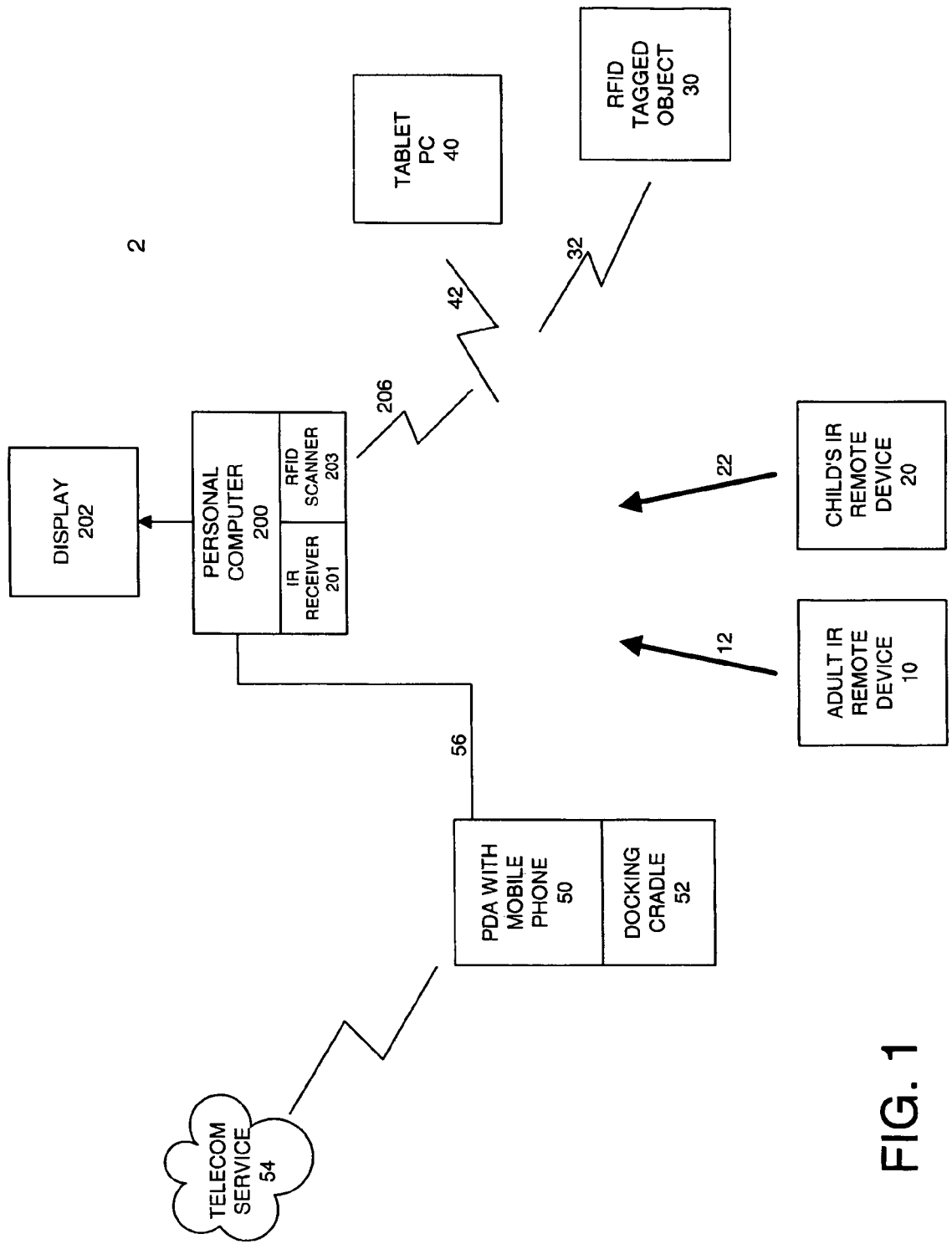
FIG. 1 is a block diagram of an embodiment of a system of the invention.

FIG. 1 illustrates an embodiment of the system of the invention. A system 2 may include a plurality of participants such as a tablet PC 40, a personal digital assistant (PDA) with a mobile phone 50 associated with a docking cradle 52 and a telecommunications service 54, and personal computer 200 connect with a display 202. The personal computer 200 may also be connected with an infrared receiver 201, a radio frequency identification (RFID) tag scanner 203, and wirelessly connected to an Ethernet network. The system 2 may additionally include remote control devices such as an adult infrared (IR) remote device 10 and a child's IR remote device 20, and an RFID tagged object 30. The participants in the system 2 may communicate with one another using different techniques including IR, universal serial bus (USB), Ethernet, RF, and others.

All of the described components are participants in the system. While the tablet PC 40, the PDA with mobile phone 50, and the personal computer 200 may function as active components, other components such as the RFID tagged object 30 may function as passive components detectable by the active components. Detection of a passive component may cause the active components to launch a particular application. The active components may be connected in a peer-to-peer system in which there is no serve or alternatively, one active component may be designated as a server. The interaction between the components will be described further below with respect to FIGS. 4-9, and is particularly described in the context of a peer-to-peer environment.

Figure 2:
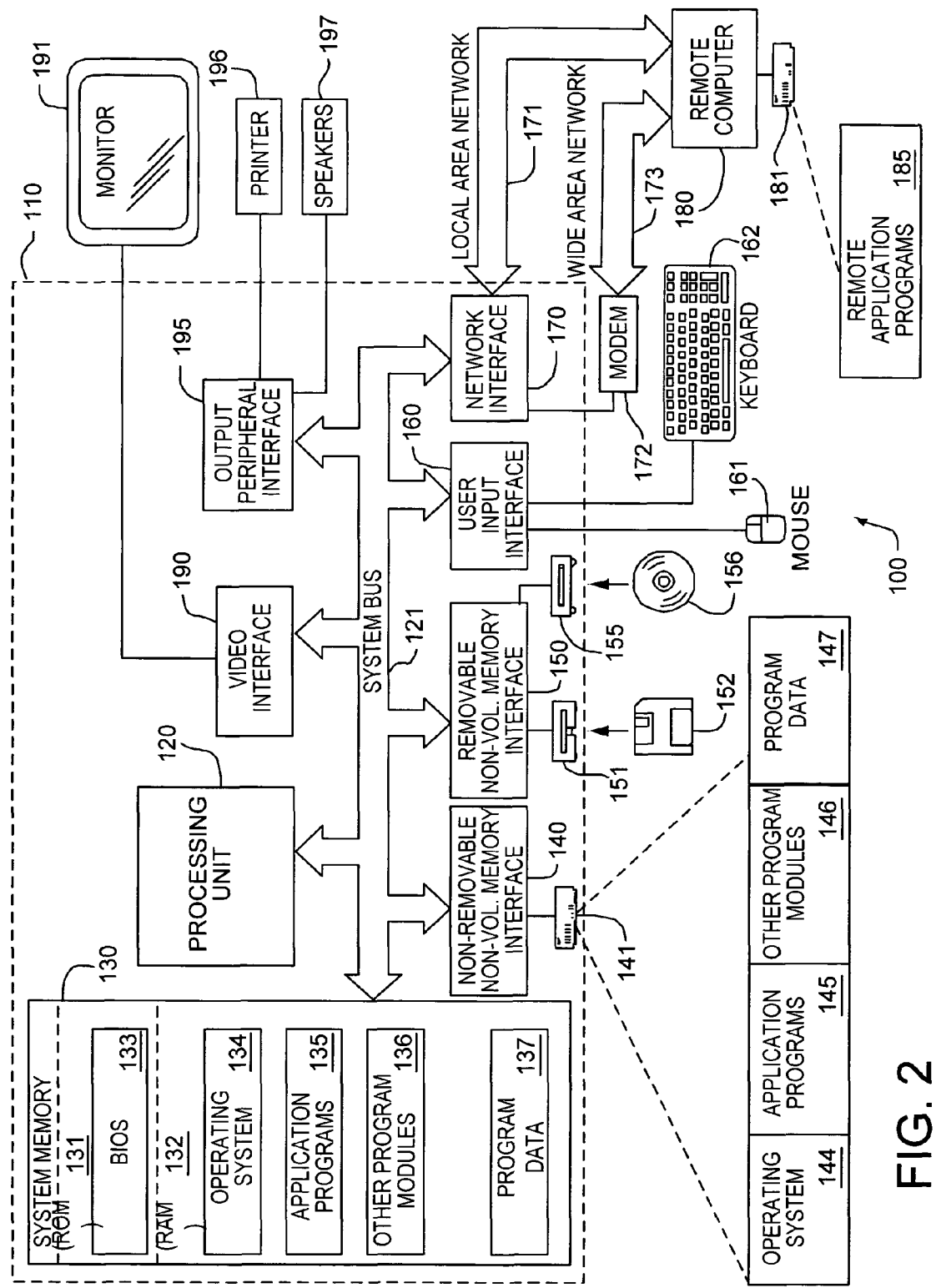
FIG. 2 is a block diagram showing a suitable computing environment for implementing the system of the invention.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a USB. A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 3:
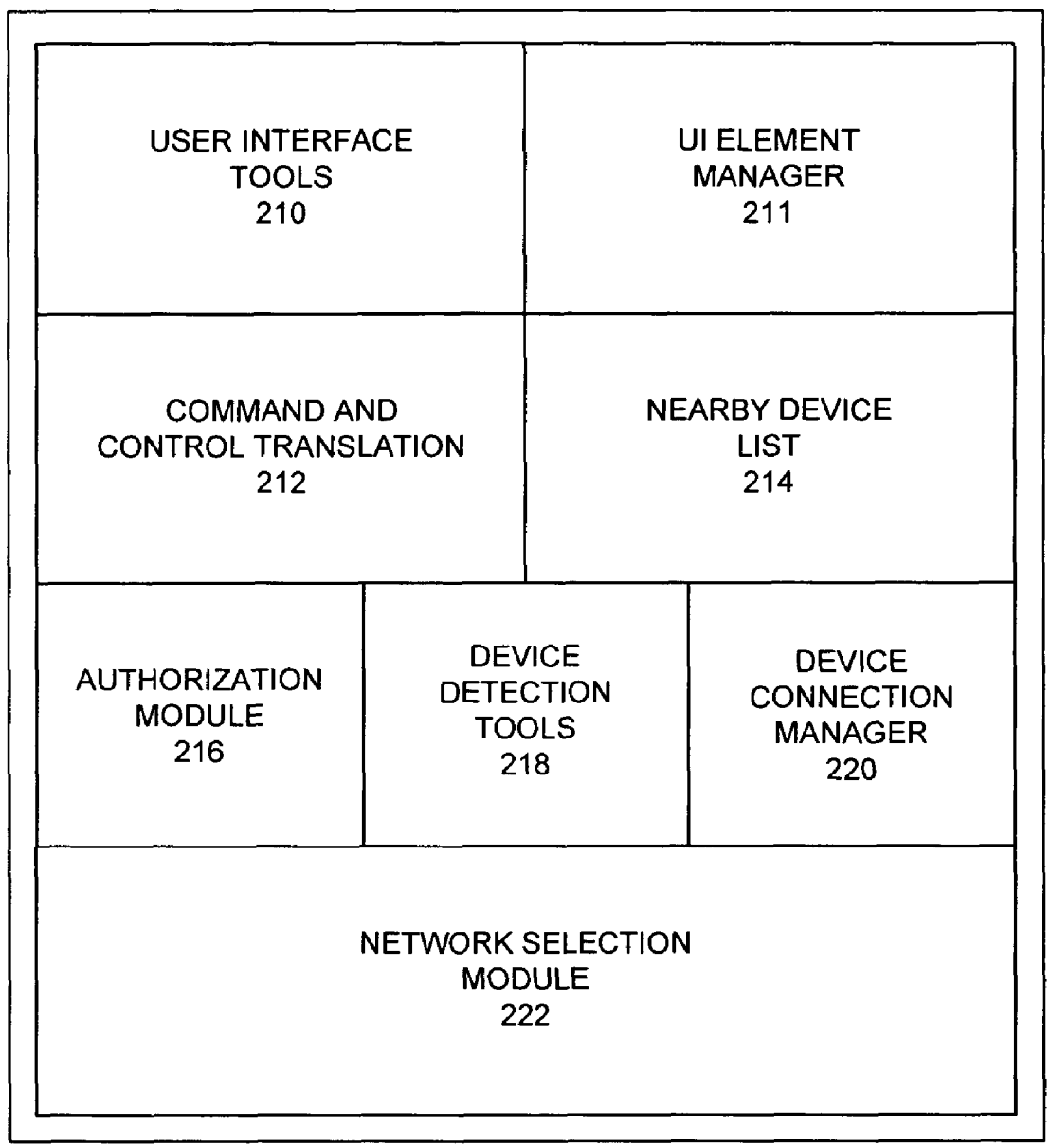
FIG. 3 is a block diagram illustrating a software platform for use in an embodiment of the invention.

FIG. 3 is a block diagram illustrating an exemplary platform in accordance with an embodiment of the invention. The active components described above with respect to FIG. 3, are executed by a computing device such as the personal computer 200, the table PC 40, and the PDA with mobile phone 50 may include the components shown in FIG. 3. The components may function within a computing environment such as that described above with respect to FIG. 2. The components may include user interface (UI) tools 210, UI element manager 211, a command and control translation module 212, a nearby device list 214, an authorization module 216, device detection tools 218, a device connection manager 220, and a network selection module 222.

The device detection tools 218 may be employed on each active participating device in the system in order to detect other participating devices in the immediate environment. Upon detection, by the device detection tools 218, the authorization module 216 may be consulted to determine which of the devices will be the controlling device and which device will be controlled. The device connection manager 220 secures a connection between the controlled and controlling devices.

The authorization module 216 preferably interacts with the nearby device list 214, which keeps track on each active device of all of the nearby participants. The authorization module 216 may be configured by the user to establish a hierarchy of devices or a defining policy for determining which devices will obtain resources from other devices. For example, the personal computer authorization module 216 may be configured to control the tablet PC. In this instance, if the tablet PC is brought in the vicinity of the personal computer, the authorization module 216 or the command and control translation module 212 may be configured with a set of rules including a rule stating that the tablet PC will display the user interface of the personal computer. Aside from a user interface, the tablet PC may acquire other features, characteristics, or applications from the personal computer as dictated by these components that have been configured by the user.

Additionally, the set of rules within the authorization module 216 should be able to resolve possible conflicts between devices such that given any combination of devices in the environment, each device shares a predetermined set of characteristics or acquires a predetermined set of characteristics from each other device. The arbitration may be arranged in a hierarchy so that a device at the top of the hierarchy will cause devices lower in the hierarchy to acquire its user interface or other resources. Optionally, arbitration can also be on a first come, first serve basis, in which any participant entering the environment acquires the user interface of the participant first present in the environment.

In one embodiment, the authorization module 216 may include two pieces of information. The first is whether the particular participant is a controlled participant or a controlling participant. Thus, when the two proximal participants include one controlling participant and one controlled participant, no conflicts arise. However, in the instance of a conflict, the authorization module refers to a second internal source of information that includes arbitration information as described above. Alternatively, arbitration information could be stored as a component separate from the authorization module 216.

The network selection module 222 may control communications between system participants. The particular network selected may depend upon the nature of the communicating devices. Examples of networks that may be selected include IR, USB, Ethernet, RF, and telecommunications. A base layer of the application shown in FIG. 3 preferably comprises a self-configuring network facilitating communication between all participating devices. Each participating device may communicate with other participating device via multiple communication modes.

The command and control translation module 212 receives commands from the user interface tools 210 and communicates user commands to the authorization module 216. The command and control translation module 212 may store user input as to particular actions that should be taken when the participating device is the controlling device and when the participating device is the controlled device. The user may interact with the software platform by a keyboard and mouse or by a selection of infrared remote controls, or by any other suitable technique. The UI element manager 211 manipulates the user interface in accordance with the user-defined rules from the authorization module 216 and the command and control translation module 212.

The nature of the system and the ability to implement user controls, such as through the use of the authorization module 216 render the proposed system ideal for use in a home environment. Participants in the system including those shown in FIG. 1 may have the ability to detect each other's presence using the device detection tools 218 when the devices are within the home. A purchaser such as parent may have the right to use the authorization module to 216 to control the functioning of all of the participants.

FIGS. 4-8 display a plurality of scenarios in which three devices including a personal computer, a tablet PC, and a phone PC interact. In a first Scenario A, the personal computer and tablet PC are adjacent one another in location 1 and the phone PC is in a remote location. In a second scenario B, the phone PC moves into the room, and in Scenario C, the tablet PC is removed from the environment. These scenarios are reflected in Table 1 below. The figures illustrating the screen display for the listed device are included in parentheses.

TABLE 1

| | SCENARIO | | |
|---|---|---|---|
| LOCATION | SCENARIO A | SCENARIO B | SCENARIO C |
| LOCATION 1 | Personal Computer (FIG. 4A) (FIG. 4A) Tablet PC (FIG. 5A) | Personal Computer (FIG. 4B) (FIG. 4B) Tablet PC (FIG. 5A) Phone PC (FIG. 6B) | Personal Computer (FIG. 4C) (FIG. 4C) Phone PC (FIG. 6B) |
| REMOTE LOCATIONS | Phone PC (FIG. 6A) | | Tablet PC (FIG. 5B) |

Figure 4A:
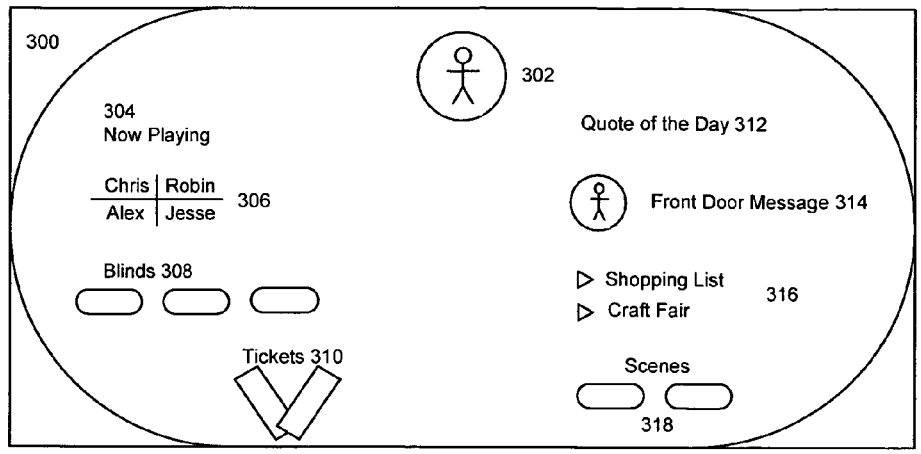
FIGS. 4A-4C illustrate a series of screen displays for a participating device based on its proximity to another participating device in accordance with an embodiment of the invention.

FIG. 4A shows an embodiment of a personal computer user interface 300. In a home environment, the personal computer may be placed in a common access area such as the kitchen. The displayed user interface 300 includes a photo 302, a "Now Playing" option 304, personal headlines 306 for each member of the family, blinds controls 308, a tickets shortcut 310, a quote of the day 312, and a front door message option 314. The user interface 300 also includes shortcuts 316 to a shopping list and a craft fair. Finally, the user interface 300 shows scenes 318. Elements of the application user interface 300 may include a link presented as a dynamic real-time thumbnail view to a calendar applet nested further down in the application (and not currently visible) as well as a door message applet that renders a photo and audio message captured by a networked device installed at an external doorway.

Figure 4B:
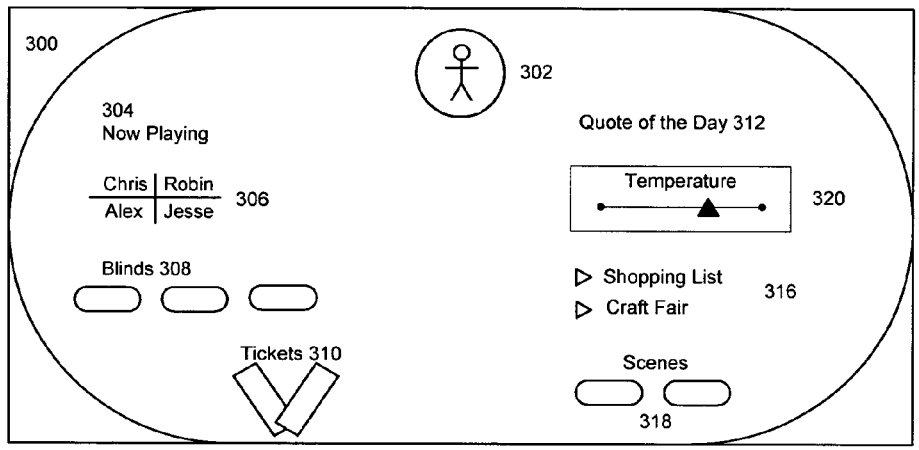

FIG. 4B shows the personal computer user interface 300 after the detection tools 218 of the personal computer detect the phone PC docked adjacent the PC. FIG. 4B shows many of the same features. However, in accordance with pre-set authorization rules, the front door message 314 has moved to the phone display and has been replaced on the user interface 300 by a temperature gauge 320.

Figure 4C:
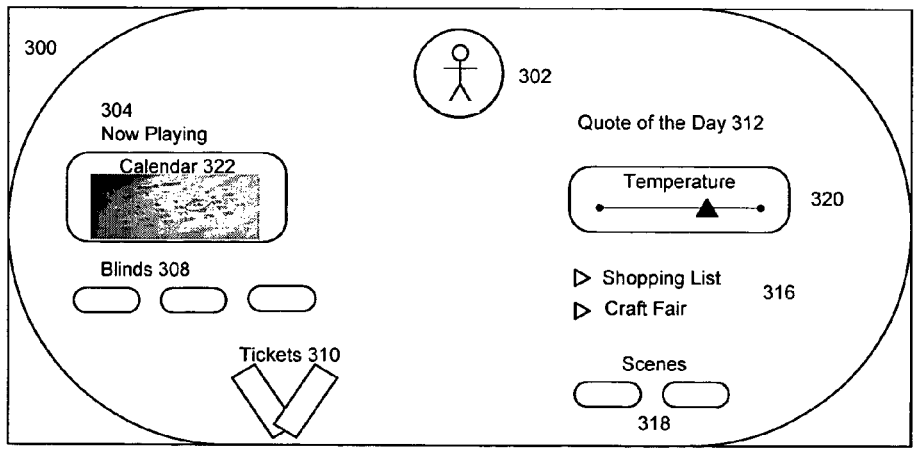

FIG. 4C shows the personal computer user interface 300 when a previously adjacent tablet PC is removed. In this instance, the personal headlines 306 have been replaced by a shortcut to a calendar 322.

Figure 5A:
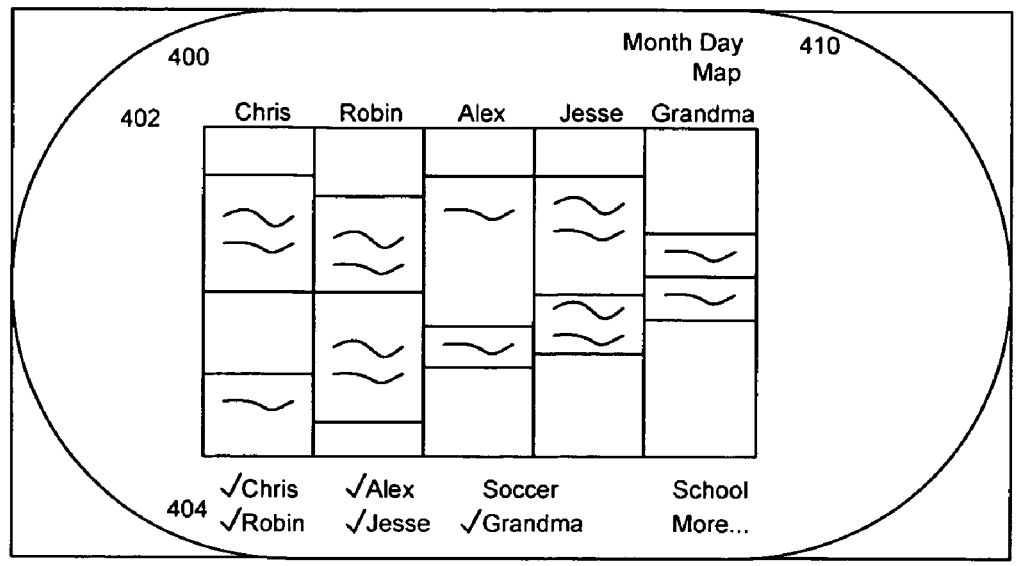
FIGS. 5A and 5B illustrate an additional series of screen displays of a participating device based on its proximity to another participating device in accordance with an embodiment of the invention.
Figure 5B:
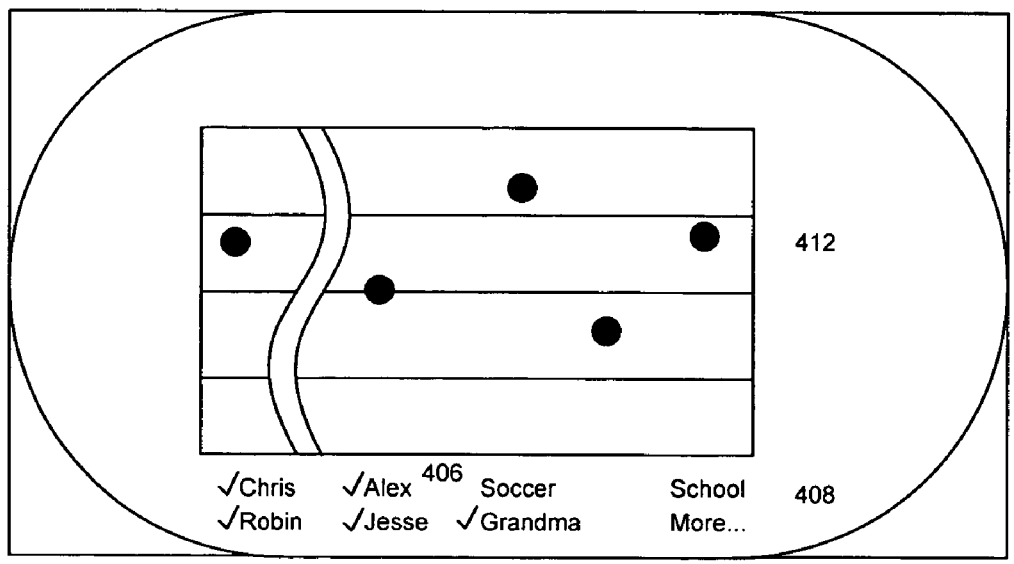

FIGS. 5A and 5B illustrate the screen display 400 for the tablet PC. A docking cradle for the tablet PC can be manually registered in the application as being proximal. When a user places the tablet PC in the nearby docking station, the tablet PC notifies the personal computer that it is docked. The personal computer may request and receive permission to control the tablet PCs display if the authorization rules are consistent.

In FIG. 5A, the tablet PC is adjacent the personal computer in Scenario A and includes a full screen family calendar 402 with the names of each family member listed across the top of the calendar and with each displayed name checked off at the bottom in section 404. The calendar has three possible views 410 including month view, day view, and map view. The user may select any of these views and furthermore may check off any of the items listed in section 404 in order to alter the display. The calendar in FIG. 5A is shown in day view. In Scenario B, the tablet PC is unaffected by the introduction of the phone PC and continues to display the calendar shown in FIG. 5A. In Scenario C, the display of the tablet PC is not altered by its removal from the vicinity of the personal computer. However, the user interface 400 is shown in map view 412 for illustrative purposes.

Figure 6A:
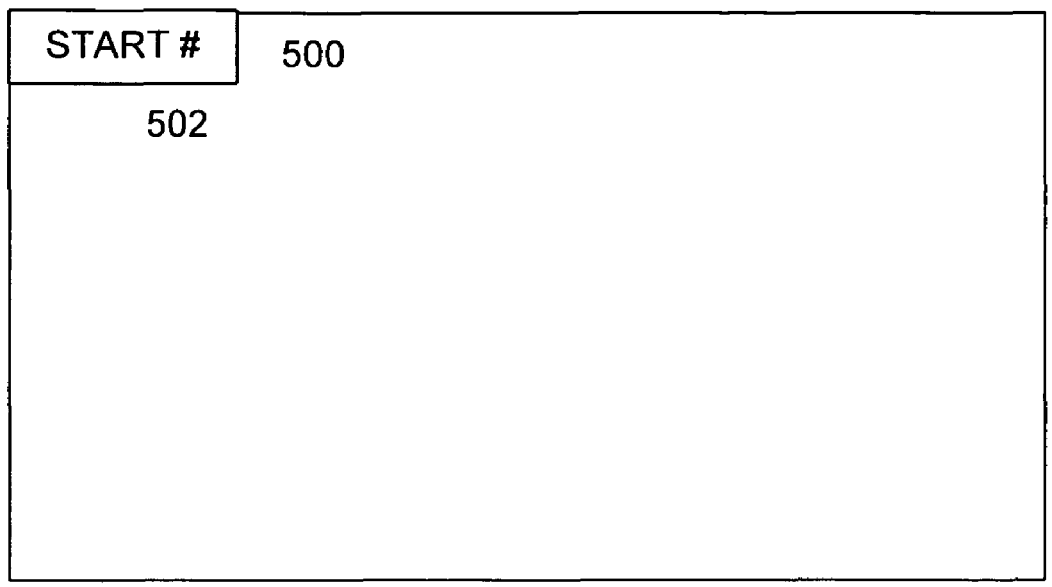
FIGS. 6A and 6B illustrate an additional series of screen displays of a participating device based on its proximity to another participating device in accordance with an embodiment of the invention.
Figure 6B:
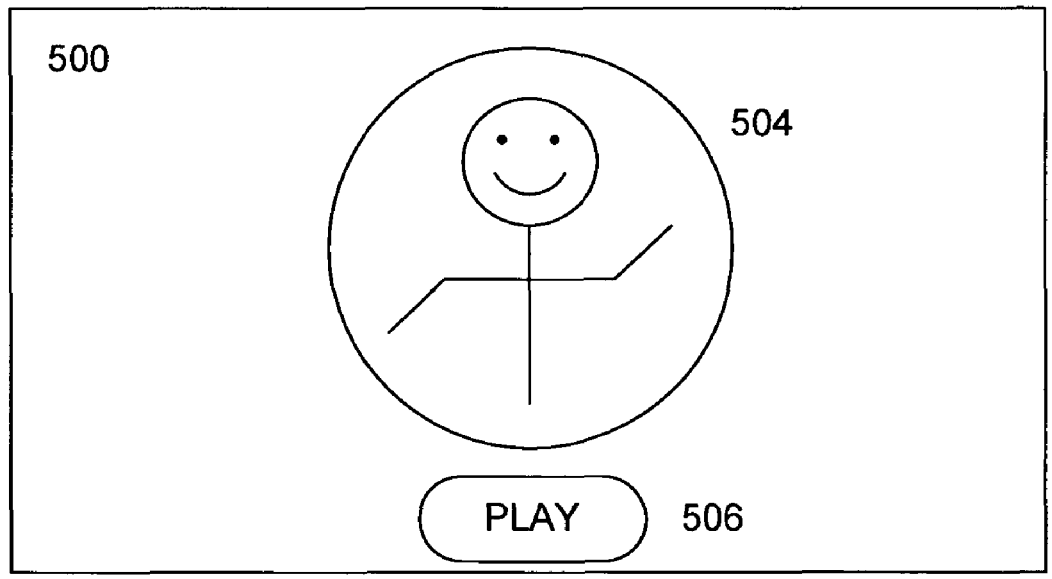

FIGS. 6A and 6B illustrate a phone PC display 500. In FIG. 6A, the phone PC display is shown with its default screen with the "start#" box 502. When the phone PC is brought into the vicinity of the personal computer in Scenario B, the phone PC display 500 is shown in FIG. 6B. The phone PC launches its full screen "front door message" display 504, which shows an image captured at the front door. A play button 506 may be activated to play an audio message recorded at the front door. In scenario C, the phone PC is not altered by the removal of the tablet PC from the environment. Accordingly, the display of FIG. 6B is also shown in scenario C.

As noted above with respect to FIG. 1, some participants in the system 2, such as the RFID tagged object 30 are passive rather than active participants and do not include screen displays. FIGS. 7A-7C, 8A, and 8B illustrate the interaction between an RFID tagged object and a tablet PC that actively participates in the system 2.

Figure 7A:
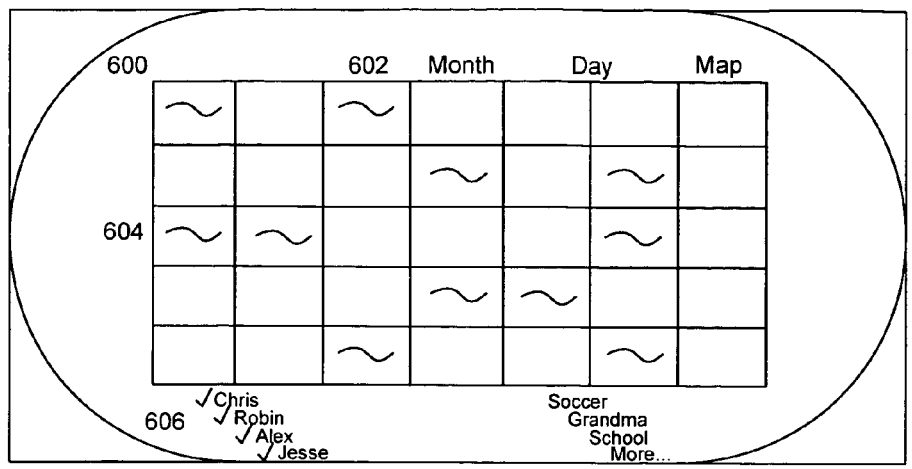
FIGS. 7A-7C illustrate screen displays of a participating device when it senses proximity of a participating object in accordance with an embodiment of the invention.
Figure 7B:
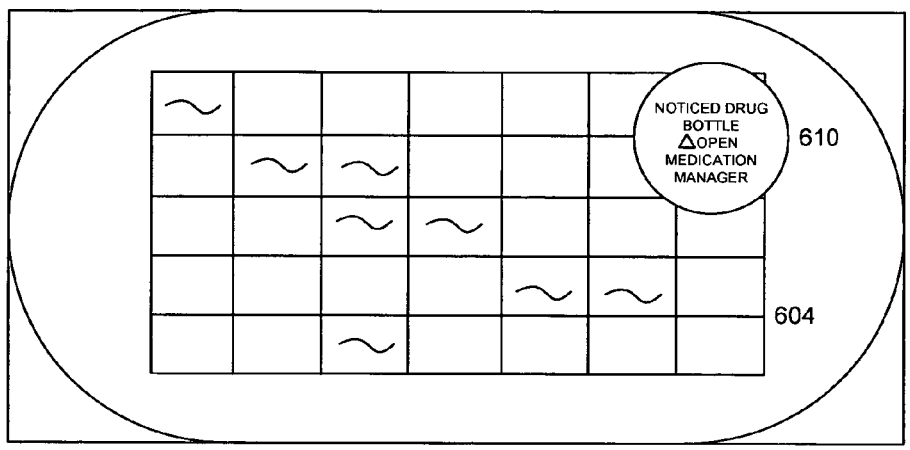
Figure 7C:
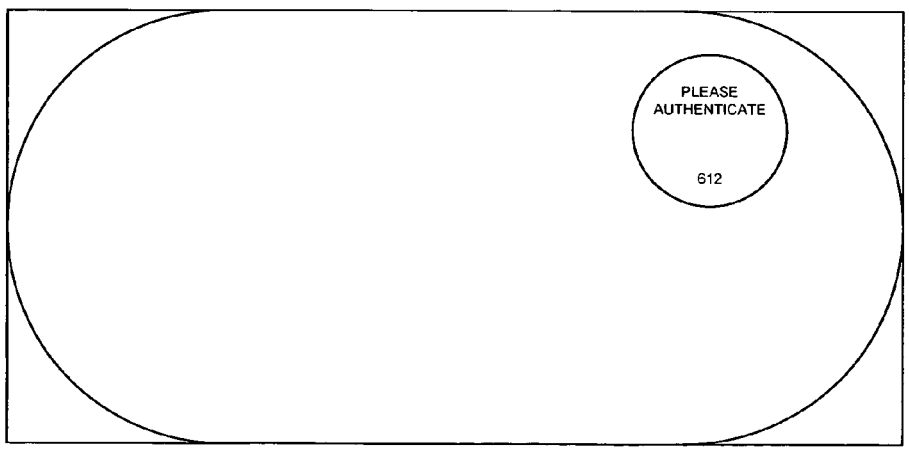

FIG. 7A illustrates a screen display 600 of the tablet PC that includes a calendar 604 shown in month view 602. The displayed participants are checked at section 606. The tablet PC detects and RFID tag in the vicinity. If the tablet PC determines that the RFID tag belongs to a drug bottle as shown in FIG. 7B, the user interface 600 may be altered to include a shortcut to a medication manager application. In FIG. 7C, the tablet PC presents an authenticate challenge. The authenticate challenge may include a voice authentication process or any other appropriate authentication process.

Figure 8A:
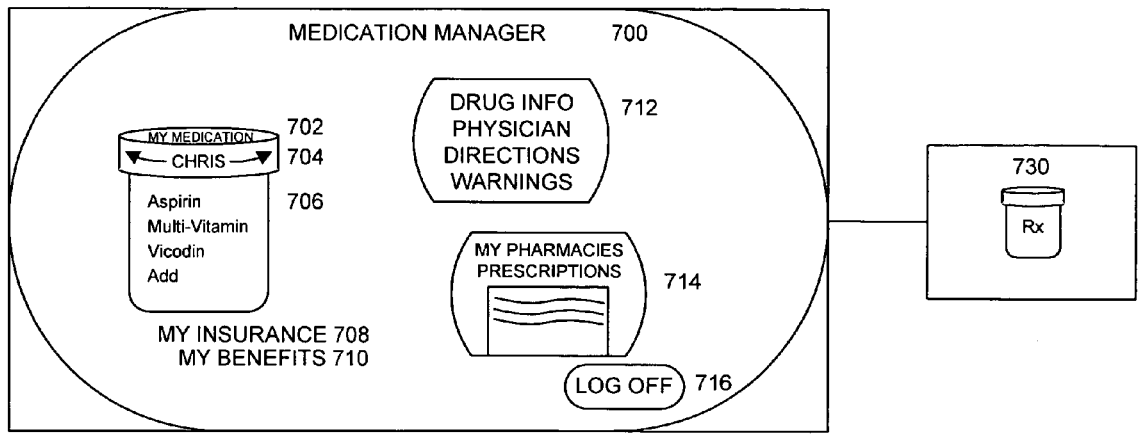
FIGS. 8A and 8B illustrate additional screen displays in which a participating device operates based on the proximity of a participating object.

FIG. 8A illustrates a medication manager screen display 700 that appears upon successful login. The medication manager screen display 700 includes a medication icon 702 with the name 704 of the medication owner 703 and a list of medications 706. The screen display may further include selectable options such as "my insurance" 708 and "my benefits" 710. An information section 712 may include drug information, physician information, directions, and warnings. The medication manager 700 may further include a "my pharmacies" and prescriptions section 714. A logoff shortcut 716 may also be included. The detected medication is included for illustrative purposes at 730.

Figure 8B:
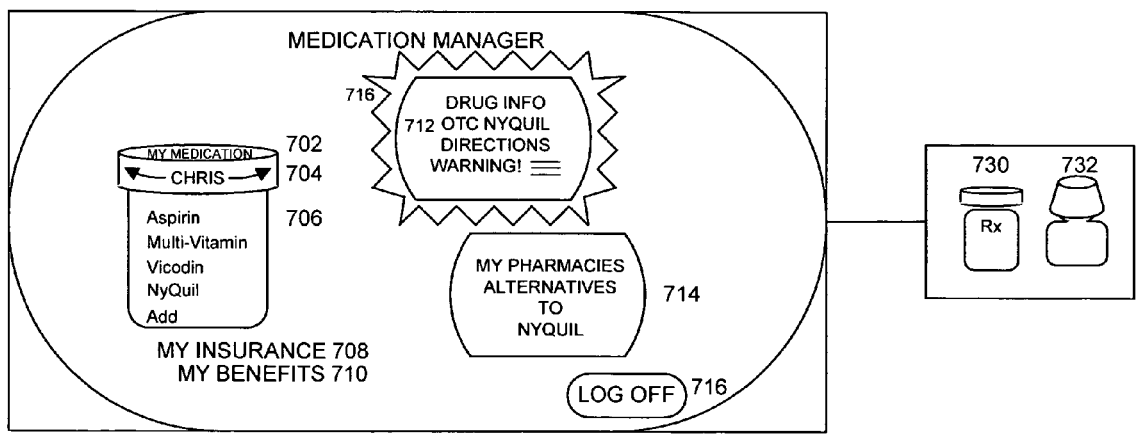

FIG. 8B illustrates a medication manager screen display that appears upon the detection of an additional RFID tagged over-the-counter medication, such as NyQuil™, shown as 732. The over-the-counter medication is automatically added to the medications list 706 and drug info area 712. The medication manager application detects a potential overdose and displays an alarm highlight 716. The "my pharmacies" area 712, also lists alternatives to the over-the-counter medication. If the over-the-counter medication is removed from the vicinity of the tablet PC, the warnings disappear. Upon selecting the logoff shortcut 716, a user will be re-directed to the calendar display of FIG. 7A.

As illustrated in FIGS. 4-8, the user interfaces of each participant may dynamically span multiple devices by leveraging and managing the displays of nearby devices. Each interface may dynamically adjust its menu based on nearby objects, or it may dynamically adjust its interaction methods based on the types of nearby human interface devices. Additionally, services provided through nearby devices may adjust their offerings based on the collection of devices or objects in the area. A user interface that dynamically and intelligently adjusts its presentation to reflect the proximity of nearby objects or devices increases the quality of the user experience.

Figure 9:
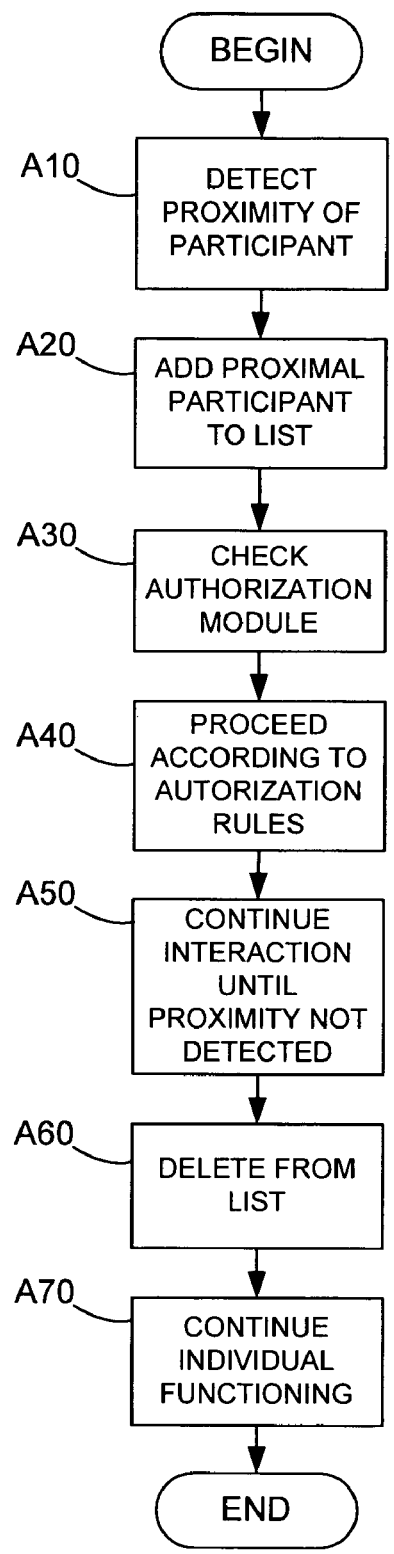
FIG. 9 is a flow chart illustrating a method in accordance with an embodiment of the invention.

FIG. 9 illustrates a method for implementing an embodiment of the invention. In step A10, a participant detects the proximity of another participant. Depending on the character of the participants, the detection may be mutual. However, if one participant is active and the other is passive, the active participant detects the passive participant. In step A20, active participants will add the detected participant to the device list. In step A30, active participants check the authorization module and the command and control translation module to determine appropriate user interface actions. In step A40, active participants proceed according to authorization rules and configuration rules, generally by making changes to the user interface of a controlled device. In step A50, if proximity is no longer detected, the departed participant is deleted from the list in step A60. Individual participant functioning is resumed in step A70. The steps described above can be performed in various orders and should not be limited by the sequence described above.

In an embodiment of the method described above, a docking cradle for the tablet PC can be manually registered in the application as being proximal. When a user places the tablet PC in the nearby docking station, the tablet PC notifies the personal computer that it is docked in step A10. The personal computer and tablet PC then may add each other to their respective device lists in step A20. In step A30, the personal computer may request and receive permission to control the tablet PCs display if the authorization rules are consistent. In an embodiment of the invention, the authorization rules allow the personal computer to take control of the tablet PC display and extend its own UI onto the tablet PC display surface. If the personal computer application determines that it can improve the quality of its user experience by rendering the calendar applet on the tablet PC's display, it will perform this action.

Similarly, if participating devices include a PDA and a desktop PC, when a user places the PDA in a docking cradle connected to the desktop PC, the desktop PC detects this in step A10. The PDA and desktop PC add each other to their respective device lists in step A20 and determine the authorization rules in step A30. If the desktop PC is the controlling device, it takes control of the PDA's display and extends its own UI onto the PDA display surface in step A40. For example, if the desktop PC's controlling application determines that it can improve the quality of the user experience by moving the door message applet onto the PDA's display, it will perform this action. The position on the desktop PCs display previously held by the door message applet is replaced by a lower-value applet or link. Also, the telecommunication services accessible to the PDA may be made available to the controlling application while the PDA is docked.

In a further example, the participants include a remote control and a desktop PC. In the event the user chooses to control the UI on the desktop PC with a remote control, the platform detects and identifies the particular remote control being used and adjusts the UI based on that remote. As an example, commands issued from an adult's remote control device cause the UI to adjust its presentation to provide access to services, control, and content appropriate for an adult user. Should control be attempted with a child's remote, the UI adjusts itself to provide access and control appropriate for a child user.

In a further example in which the participants include an active and a passive participant, a user may place an RFID tagged object within range of the RFID scanner connected to a desktop PC. The RFID tagged object is detected by the desktop PC scanner in step A10. The desktop PC may identify the object by looking up the tag ID in databases either hosted by the desktop PC or accessible via the wireless network. Based on the identification, the PC retrieves relevant application information.

In summary, the invention provides a platform for a user interface that makes use of nearby intelligent objects or devices to improve its usefulness. The interface may dynamically span multiple devices by leveraging and managing the displays of nearby devices. It may dynamically adjust its menu based on nearby objects or it may dynamically adjust its interaction methods based on the types of nearby human interface devices. Additionally, services provided through nearby devices may adjust their offerings based on the collection of devices or objects in the area. A user interface that dynamically and intelligently adjusts its presentation to reflect the proximity of nearby objects or devices increases the quality of the user experience.

As set forth above, services of one participant are available on another through cooperative interaction between participants. The platform is preferably a peer-to-peer distributed platform and participants derive knowledge from proximity. If a participating device enters the defined environment, it becomes part of the system. The base layer is a self-configuring network and dynamic software tools such as the authorization module allow user to change resources available from and to each device.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and with the scope of the claims.

We claim:

1. A computer system for facilitating interaction between a first participating device having a computer processor and storage and the first participating device's immediate environment, the system comprising:
   a detection module on the first participating device having the computer processor, the storage and the first user interface for automatically detecting proximity of a second participating device having a second user interface within the first participating device's immediate environment and utilizing such proximity detection to generate a dynamically updated list of detected nearby devices within the first participating device's immediate environment, wherein proximity of the second participating device within the first participating device's immediate environment is close in physical space, and wherein the list of detected nearby devices includes a record of the first and second participating devices detected by the detection module to be close in physical space that are able to communicate with one another, and their respective physical locations within the proximity of one another; and
   a user-configurable authorization module on the first participating device authorizing the first participating device interacting with the list of the detected nearby devices to adjust the user interface of a first of the listed devices on the list of detected nearby devices in a predetermined manner to display contents of the user interface of a second of the listed devices on the list of detected nearby devices in response to the detection of the proximity of the second participating device within the first participating device's immediate environment, wherein the user-configurable authorization module comprises an arbitration module for resolving disputes between devices having an identical authorization status.

2. The system of claim 1, wherein the user configurable authorization module identifies one of the first participating device and the second participating device as a controlling device and the other as a controlled device.

3. The system of claim 2, wherein the controlling device comprises shared resources for sharing with the controlled device.

4. The system of claim 1, wherein the detection module detects one of an active participant and a passive participant.

5. The system of claim 4, wherein the detection module detects the passive participant and the device user interface adjusted is a detecting device user interface.

6. The system of claim 4, wherein the detection module detects the active participant and the user-configurable authorization module authorizes adjustment of the device user interface of a detected active participant.

7. The system of claim 1, wherein the user-configurable authorization module includes an authorization status to control the second participating device.

8. The system of claim 1, wherein the user-configurable authorization module includes an authorization status to be controlled by another device.

9. The system of claim 2, further comprising a command and control translation module for receiving instructions from a user regarding actions to be taken by the controlling device.

10. The system of claim 9, further comprising a UI element manager for taking directions from the command and control translation module.

11. A method being performed by a processor and a memory for facilitating interaction between a device and a device immediate environment, the method comprising:
   detecting, via a first computing process, a participant present within the device immediate environment;
   maintaining, via a second computing process, a dynamically updated list of detected nearby devices within the device immediate environment for each device, wherein the list of detected nearby devices maintains a record of participants that are able to communicate with another device detected to be close in physical space and their physical locations within the proximity of the device; and
   adjusting in response to the detection of the participant present within the device immediate environment and interaction with the list of detected nearby devices, via a third computing process, the user interface of a first device on the list of detected nearby devices to display contents of the user interface of a second device on the list of detected nearby devices based on user-configured rules set forth in the device authorization module in response to the detection of the participant present within the device immediate environment, wherein the device authorization module identifies the device as one of a controlling device and a controlled device and resolves disputes between devices having an identical authorization status,
   and wherein each of the first, second, and third computing processes are performed by the device.

12. The method of claim 11, further comprising sharing resources from the controlling device with the controlled device.

13. The method of claim 11, further comprising detecting one of an active participant and a passive participant.

14. The method of claim 11, further comprising detecting a passive participant and authorizing a detecting device to adjust the device user interface of the detecting device.

15. The method of claim 14, wherein the passive participant has an RFID tag and the detecting device launches an application in response to the detection of the RFID tag.

16. The method of claim 14, further comprising detecting an active participant, and authorizing adjustment of the active participant user interface.

17. The method of claim 11, further comprising receiving instructions from a user regarding actions to be taken by the controlling device.

18. A system for sharing resources among multiple participating devices, wherein each of the multiple participating devices has a computer processor, storage and a device specific set of application resources, the system comprising:
   a detection module on a first participating device having the computer processor and the storage for detecting proximity of the first participating device to a second participating device, wherein proximity of the first participating device to the second participating device is close in physical space;
   a dynamically updated nearby device list of detected devices within the first participating device's immediate environment maintaining a record of the first and second participating devices detected to be close in physical space that are able to communicate with one another and their physical locations within the proximity of the one another; and
   a configurable resource regulation mechanism interacting with the nearby device list and determining, based on a defining policy of the configurable resource regulation mechanism that establishes which of the first and second participating devices will obtain the resources from the other, that a first of the listed devices will acquire the device specific application resources from a second of the listed devices in response to detecting the proximity of the first participating device to the second participating device, wherein the configurable resource regulation mechanism comprises a user-configurable authorization module for providing each participating device with an authorization status as one of a controlled device and a controlling device, the controlling device comprising shared resources for sharing with the controlled device, and an arbitration mechanism for resolving disputes between devices having an identical authorization status.

19. A method being performed by a processor and a memory for facilitating resource sharing between multiple devices, the method comprising:
   allowing, via a first computing process, a user to configure regulation of shared resources between multiple participating devices, each participating device communicates directly with at least one other participating devices; and
   maintaining, via a second computing process, a list of detected participating devices based on proximity within an immediate environment to a first participating device, wherein proximity within an immediate environment is detected to be close in physical space, and wherein the list of detected participating devices is dynamically updated and maintains a record of the participating devices that are able to communicate with another device detected to be close in physical space and their physical locations within the proximity of the first participating device; and
   enabling, via a third computing process, regulation of device resources in response to the detected proximity of a first participating device to a second participating device based on interacting with the list of detected devices and on a defining policy of the configurable resource regulation mechanism that establishes which of the first and second participating devices will obtain the resources from the other, wherein regulation includes acquiring device specific application resources of a first of the listed devices by a second the second of the listed devices based on an authorization status identifying each device as one of a controlling device and a controlled device using an authorization module and resolving disputes between devices having an identical authorization status, and wherein each of the first, second and third computing processes is performed by one or more of the multiple devices.

20. The method of claim 19, further comprising sharing resources from the controlling device with the controlled device.

* * * * *